Dec. 16, 1969 O. W. CRAIG 3,484,674
MULTIVIBRATOR HAVING AN OUTPUT FREQUENCY INDEPENDENT OF FLUCTUATIONS IN ENERGIZING VOLTAGE
Filed Sept. 29, 1967 2 Sheets-Sheet 1

INVENTOR.
ORLYN W. CRAIG
BY
R. Skolnick

INVENTOR.
ORLYN W. CRAIG
BY
[signature]

United States Patent Office 3,484,674
Patented Dec. 16, 1969

3,484,674
MULTIVIBRATOR HAVING AN OUTPUT FREQUENCY INDEPENDENT OF FLUCTUATIONS IN ENERGIZING VOLTAGE

Orlyn W. Craig, Bristol, Tenn., assignor to Sperry Rand Corporation, a corporation of Delaware
Filed Sept. 29, 1967, Ser. No. 671,750
Int. Cl. H02m 7/44, 7/68
U.S. Cl. 321—45 6 Claims

ABSTRACT OF THE DISCLOSURE

A multivibrator type frequency converter is constructed to produce an AC square wave output having a frequency independent of fluctuations in the energizing source, and a frequency controlled by variations in an element subject to impedance changes related to changes in energy level of a variable being measured. In another embodiment the frequency converter produces an output which drives another multivibrator constructed with a delay means so that its output is the same as the first output but delayed with respect thereto. The two outputs are combined to produce a series of DC pulses with pulse width being a function of a delay between the outputs of the multivibrators. The delay period is controlled by changes in impedance of a sensing element in the second multivibrator with this sensing element being part of a sensor for detecting energy level changes in a variable. The multivibrators are constructed so that the repetition rate of the DC pulses is independent of fluctuations in the energizing source.

This invention relates to means for converting changes in energy level to electrical signals and more particularly relates to solid state converter means including novel oscillator and delay circuits.

In this age of automation it is often necessary to convert amplitudes of various types of energy such as electrical, heat, light, chemical and mechanical, or amplitudes of other physical variables such as acceleration, velocity, pressure and magnetic flux density into either AC square wave voltage having a frequency proportional to the amplitude of the input varialbe or DC pulses whose pulse widths are proportional to the amplitude of the input variable. Output signals of this type are used for monitoring or measuring the amplitude of the input variable or are utilized to signal, regulate or control equipment used in conjunction with the input variable.

As will hereinafter be seen, the instant invention provides novel oscillator or multivibrator circuits and novel delay circuits for producing useful AC square waves and pulsating DC signals. The circuits are such that remote sensing of the variable is permitted and electrical isolation of the input and output circuits is readily achieved.

Accordingly, a primary object of the instant invention is to provide novel converter means for producing an electrical signal proportional to changes in energy state of an input variable.

Another object is to provide converter means of this type including an oscillator or multivibrator which produces a square wave output of constant frequency regardless of fluctuations in an energizing source for the converter, with output frequency being related to changes in an input variable.

Still another object is to provide converter means of this type including a novel delay circuit for producing DC pulses the width of which remains constant regardless of variations in an energizing source for the converter, with pulse width being related to changes in an input variable.

A further object is to provide a novel converter of this type which is simple, of small size, low in cost, reliable, of long life, relatively maintenance free, of low power consumption, and of great versatility with respect to types of input variables that can be handled and applications which may utilize signals produced by the converter.

These as well as other objects of this invention will become readily apparent after reading the following description of the accompanying drawings in which.

Figure 1:
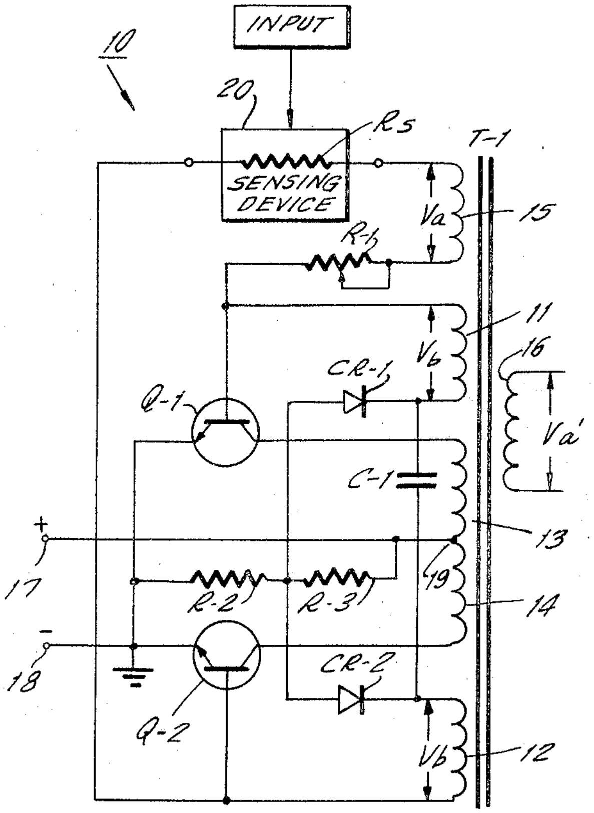
FIGURE 1 is an electrical schematic of a basic oscillator or multivibrator constructed in accordance with the teachings of the instant invention.

Now referring to the figures and more particularly to FIGURE 1. Oscillator or multivibrator 10 includes transformer T–1 having identical control windings 11 and 12, main windings 13, 14 connected at center-tap 19, timing winding 15, and output winding 16. Center-tap 19 of windings 13, 14 is connected directly to energizing terminal 17 and is connected through the series combination of resistors $R_3$ and $R_2$ to grounded energizing terminal 18. Multivibrator 10 is adapted to be energized from a DC source (not shown) with terminal 17 being positive with respect to terminal 18.

The end of winding 13 remote from center-tap 19 is connected to a main electrode, in this case the collector, of transistor Q–1 having a grounded emitter. The end of winding 14 remote from center-tap 19 is connected to the collector of transistor Q–2 having a grounded emitter. One end of control winding 11 is connected to the base of transistor Q–1 while the other end of winding 11 is connected through diode CR–1 to the junction between resistors $R_2$ and $R_3$. One end of control winding 12 is connected to the control electrode or base of transistor Q–2 while the other end of winding 12 is connected through diode CR–2 to the junction between resistors $R_2$ and $R_3$. The control winding sides of diodes CR–1 and CR–2 are connected together through capacitor $C_1$. One end of timing winding 15 is connected through variable resistor $R_1$ to the base of transistor Q–1 while the other end of timing winding 15 is connected through resistor $R_s$, of energy level sensing device 20, to the base of transistor Q–2.

Upon the application of a DC voltage at terminals 17, 18 transistors Q–1 and Q–2 are forward biased by voltage obtained from voltage divider resistors $R_2$ and $R_3$ and the current paths through CR–1 and CR–2 as well as control windings 11, 12 to the base leads of transistors Q–1 and Q–2. Because of inherent unbalance one of the transistors Q–1, Q–2 will start to conduct before the other of these transistors and upon conduction a voltage is induced in one of the control windings 11, 12 which will forward bias the conducting transistor into saturation.

Since the initial flux states in the core of transformer T–1 may be of any value between plus and minus residual flux density, the first switching of the transistors may be either due to saturation of the transformer core and magnetic switching or RC switching. All subsequent switching is due to RC with the voltage induced in timing winding 15 charging capacitor $C_1$ to initiate turn-on of the "off" transistor before magnetic saturation occurs. Frequency of the output voltage $V'_a$ is dependent upon the charging rate of capacitor $C_1$ with the latter being determined primarily by $R_1$ plus $R_s$.

Figure 1A:
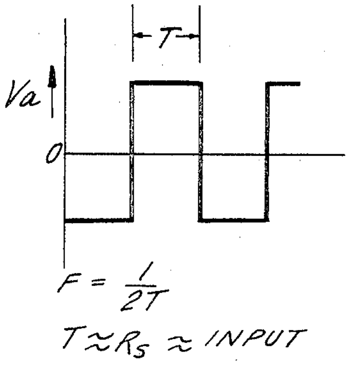
FIGURE 1A is a graph showing the output voltage for the circuit of FIGURE 1.

For a reason which will hereinafter be seen, equal voltages $B_b$, $V_b$ are induced in each of the control windings 11, 12 and voltage $V_a$ is induced in timing winding 15, with voltage $V_a$ being 1.165 times voltage $V_b$. Voltage $V'_a$ induced in output winding 16, and illustrated graphically in FIGURE 1A, has a half cycle time period T expressed mathematically in the following Equations 1 and 2.

$$T=1.1R_2C_1+(R_1+R_s)C_1\ln\frac{(V_a+2V_b)}{V_a} \quad \text{(Equation 1)}$$

T=time in seconds
R=resistance in ohms
C=capacitance in farads
$V_a$=volts induced in winding 15
$V_b$=volts induced in each winding 11 and 12

When $V_a=1.165V_b$, $$\ln\frac{V_a+2V_b}{V_a}=1$$

and $$T=C_1(1.1R_2+R_1+R_s) \quad \text{(Equation 2)}$$

This eliminates $V_a$ and $V_b$, which will vary with the DC supply, from the equation making the frequency independent of input voltage. This relationship between $V_a$ and $V_b$ need not be used if a constant DC voltage is used, or such relationship may be varied to provide optimum compensation for wide ranges of input voltage or load. Equations 1 and 2 neglect the very small effects of the semiconductors Q–1, Q–2, CR–1, CR–2 and need not be included for most applications. It has been found that actual times correspond very closely with calculated values. By selecting resistors and capacitors which have compensating temperature characteristics the frequency changes due to temperature changes can be minimized or eliminated. Naturally, transformer T–1 must be compatible with the frequency and input voltage and have sufficient turns to preclude core saturation at the lowest frequency involved.

Equation 2 shows how time T will vary with $R_s$. $R_1$ may be zero or some finite value and is used for sensitivity adjustment or calibration. $R_2$ may be small and relatively insignificant compared to $R_s+R_1$. For a given $R_s$ the time period can be adjusted to any desired value, and for a given range of values for $R_s$ the range of the corresponding time periods may be adjusted for any desired frequency spread by using appropriate values for $C_1$ and $R_1$. The input to sensing device 20 is a signal derived from a change in energy state for a variable parameter with the changes in resistance $R_s$ being detected by device 20.

Figure 2:
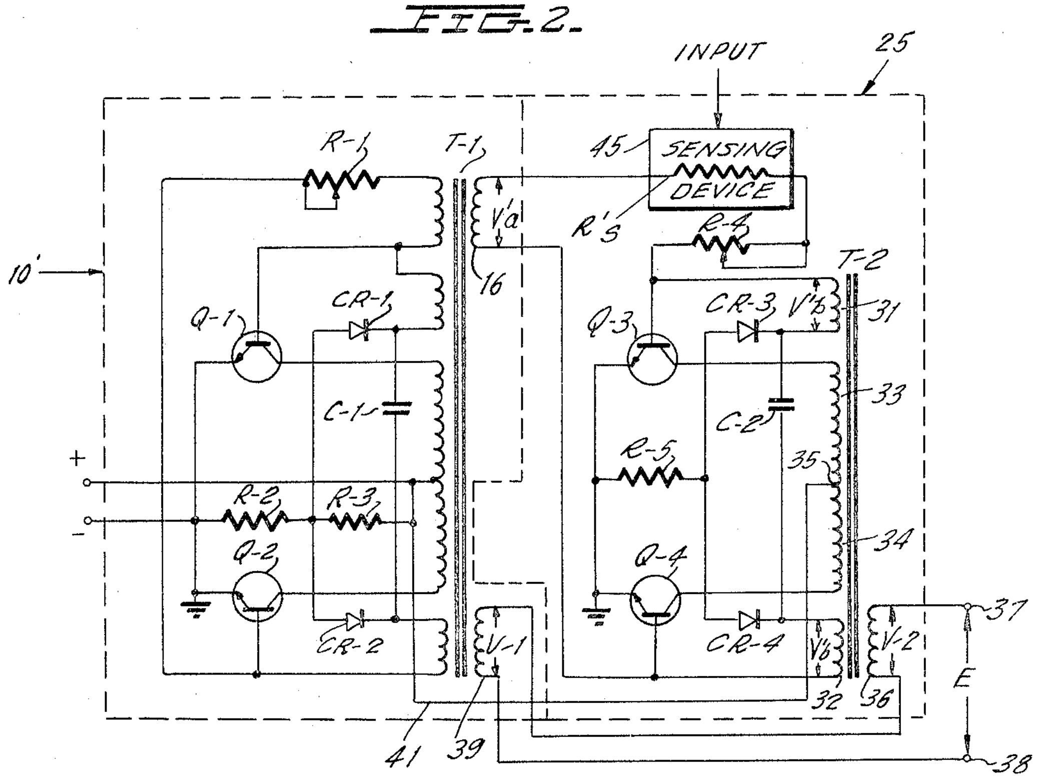
FIGURE 2 is an electrical schematic showing two circuits of the type shown in FIGURE 1 combined and including a delay circuit to produce a pulse width converter constructed in accordance with the teachings of the instant invention.

The pulse width converter of FIGURE 2 includes multivibrator portion 10′ and delay portion 25. Multivibrator 10 of FIGURE 1 with $R_s$ of sensing device 20 maintained constant corresponds exactly to multivibrator portion 10′ so that detailed description of the latter will not be undertaken.

Delay portion 25 is of the same basic construction as multivibrator portion 10′ and includes transformer T–2 having control windings 31, 32, main windings 33, 34 joined together as a single winding having a center-tap 35, and output winding 36. One end of output winding 36 is connected to output terminal 37 while the other end of winding 36 is connected through an additional winding 39, with transformer T–1 to the other output terminal 38. Center-taps 19 and 35 are directly connected by jumper 41. The end of main winding 33 remote from center-tap 35 is connected to the collector of transistor Q–3 having a grounded emitter. The end of main winding 34 remote from center-tap 35 is connected to the collector of transistor Q–4 having a grounded emitter. One end of control winding 31 is connected to the base of transistor Q–3 while the other end of winding 31 is connected through diode CR–3 to the end of resistor $R_5$ remote from ground. One end of control winding 32 is connected to the base of transistor Q–4 while the other end of winding 32 is connected through diode CR–4 to the end of resistor $R_5$ remote from ground. Capacitor $C_2$ is connected between those ends of windings 31, 32 connected to diodes CR–3 and CR–4, respectively. The base of transistor Q–3 is connected through adjustable resistor $R_4$ to one end of transistor $R'_s$ of sensing device 45. The other end of resistor $R'_s$ is connected through output winding 16 to the base of transistor Q–4.

Figure 2A:
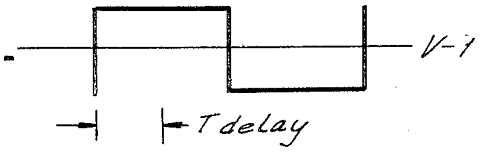
FIGURES 2A, 2B and 2C are graphs showing the time relation between the outputs of each multivibrator stages for the circuit of FIGURE 2 as well as a combination of such outputs.
Figure 2B:
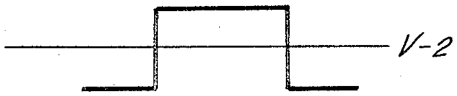
Figure 2C:
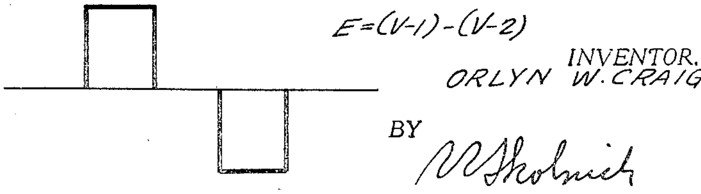

The AC square wave output $V'_a$ appearing across winding 16 is of the same form as the output V–1 (FIGURE 2A) appearing across winding 39. Voltage V–2 (FIGURE 2B) is of the same form as voltage V–1 but is delayed with respect thereto. Output voltage E (FIGURE 2C) appearing across output 37, 38 is the difference between voltages V–1 and V–2 and is a series of pulses each having a width equal to the time delay between voltages V–1 and V–2. This time delay is expressed as follows:

$$T\text{ delay}=(R_4+R_s')C_2\ln\frac{V'_a+2V'_b}{V'_a} \quad \text{(Equation 3)}$$

$$=(R_4+R'_s)C_2 \text{ when } V'_a=1.165\,V'_b \quad \text{(Equation 4)}$$

The delay portion 25 of the pulse width converter (FIGURE 2) operates on the same principle as multivibrator 10 in that the square wave output $V'_a$ of vibrator portion 10′ charges capacitor $C_2$ and switches transistors Q–3 and Q–4 after the time delay determined by resistors $R'_s$ plus $R_4$.

The output of a pulse width converter constructed in accordance with the instant invention may be either positive or negative pulses and the pulse width may be directly or inversely proportional to the amplitude of the variable being sensed, depending upon the polarity selected and rectification of the combined voltages V–1 and V–2.

Sensing devices 20 and 45 are constructed or selected to be compatible with amplitude and form of input electrical energy. Some typical sensing devices are resistors, thermistors, saturable core reactors, inductors, photocells, Hall generators, and various transducers.

The versatility of a multivibrator constructed in accordance with the teachings of the instant invention is seen by considering the following. By omitting the sensing device of FIGURE 1 the basic oscillator or multivibrator circuit may be utilized as a fixed or variable frequency device. The sensing device may be omitted and multiple basic circuits combined to produce fixed or variable frequency polyphase signals with this modification being particularly applicable to DC to DC converters and DC to AC inverters since the circuits are ideal oscillator-driver stages. The basic symmetrical square wave output may be modified to variations in values of electrical components and transformer construction to produce non-symmetrical waveforms.

The basic multivibrator circuit will provide a fixed or variable frequency, will provide single or polyphase voltages for use as secondary frequency standards, will act as an oscillator-driver, or act as a power oscillator for static power conversion. The variable pulse width generator is particularly useful as a signal generator and is ideally suited for voltage regulator circuits utilizing variable pulse width or switching regulator techniques. Further, the basic circuit hereinbefore described provides a simple means for adjustment and automatic regulation of the variable being monitored. Remote sensing apparatus may be utilized and various recording devices may be used to produce a permanent record of the variable being sensed. The basic circuit with appropriate sensing devices can be used with other components such as relays or lights to turn off power or provide warning signals when the energy level of the variable being monitored exceeds a predetermined value.

Thus, it is seen that the instant invention provides a simplified basic multivibrator circuit for producing AC square waves with frequency being controllable by a sensing device for detecting changes in energy level of an input variable. A simple combination of two of these basic multivibrator circuits is effective to produce DC pulses of uniform amplitude with pulse width being a function of changes in energy level of an input variable being monitored. For cases requiring electrical isolation from the input a saturable core reactor may be utilized to provide a variable impedance that determines the output frequency and/or pulse width.

I claim:

1. A solid state converter having a multivibrator portion including first and second controllably conductive solid state means; first and second control circuit parts connected to respective first and second control electrodes of the respective first and second solid state means; first and second main circuit parts connected to respective first and second main electrodes of the respective first and second solid state means; timing circuit means connected to said first and second control electrodes; a transformer including first and second control windings connected in the respective first and second control circuit parts, first and second windings connected in the respective first and second main circuit parts, a timing winding connected in said timig circuit, and an output winding across which appears an AC signal of a frequency controlled by said timing circuit means; said first and second control windings being phased to produce alternate conduction in said first and second main circuit parts; said first and said second control windings each having substantially the same number of turns; said timing winding having a number of turns exceeding the number of turns of each of said first and second control windings by a ratio of substantially 1.165 whereby the frequency of said AC signal is independent of amplitude fluctuations in a source energizing said converter, said solid state converter also having a delay portion including first and second additional controllably conductive solid state means; first and second additional control circuit parts connected to respective first and second additional control electrodes of the respective first and second additional solid state means; first and second additional main circuit parts connected to respective first and second additional main electrodes of the respective first and second additional solid state means; delay circuit means including said output winding connected to said first and second additional control electrodes; an additional transformer including first and second additional control windings connected in the respective first and second additional control circuit parts, first and second additional main windings connected in the respective first and second additional main circuit parts, and an additional output winding across which appears an additional AC signal frequency and amplitude having characteristics corresponding to those of said AC signal and delayed with respect to said AC signal by phase angle controlled by said delay circuit means; first and second additional control windings being phased to produce alternate conduction in said first and second additional main circuit parts; said first and said second additional control windings each having substantially the same number of turns; said timing winding having a number of turns exceeding the number of each of said first and second additional control windings by a ratio of substantially 1.165 whereby the delay of said additional AC signal with respect to said AC signal is independent of amplitude fluctuations in a source energizing said converter.

2. A converter as set forth in claim 1 also including sensor means for detecting changes in energy state of an input variable; said sensor means including an impedance means which changes its impedance in relation to changes in energy state detected by said sensor means; said impedance means connected in said delay circuit means whereby delay between said AC signal and said additional AC signal varies as said impedance means changes its impedance.

3. A converter as set forth in claim 2 in which the impedance means and said timing winding are connected in series in a first circuit; a capacitor connected in series with said first and said second additional control windings in a second circuit; said first and said second circuits connected in a parallel combination extending between said first and said second additional control electrodes.

4. A converter as set forth in claim 1 in which the transformer also includes a further output winding across which a duplicate of said AC signal appears; further circuit means connecting said additional and said further output windings to produce a combined output signal which changes in relation to changes in impedance of said means.

5. A converter as set forth in claim 4 in which said additional and said further output windings are connected in a manner such that said combined output signal is a pulsating DC signal with a frequency equal to the frequency of said AC signal, and with pulses having widths proportional to delay between said AC and said additional AC signals.

6. A converter as set forth in claim 3 also including another impedance means connected in said timing circuit means to determine the frequency of said AC signal; said another impedance means and said timing winding connected in series in a third circuit; another capactor connected in series with said first and said second control windings in a fourth circuit; said third and said fourth circuits connected in a parallel combination extending between said first and said second control electrodes.

References Cited

UNITED STATES PATENTS

| | | | |
|---|---|---|---|
| 2,937,298 | 5/1960 | Putkovich et al. | |
| 3,030,589 | 4/1962 | Kadri. | |
| 3,192,464 | 6/1965 | Johnson et al. ---- | 321—18 XR |
| 3,205,424 | 9/1965 | Bates. | |
| 3,210,690 | 10/1965 | Mokrytzki et al. | |
| 3,253,235 | 5/1966 | Harbaugh. | |

JOHN F. COUCH, Primary Examiner

W. M. SHOUP, Jr., Assistant Examiner

U.S. Cl. X.R.

331—113